US010147384B2

(12) United States Patent
Hwang et al.

(10) Patent No.: US 10,147,384 B2
(45) Date of Patent: Dec. 4, 2018

(54) BOOSTING VOLTAGE GENERATOR AND A DISPLAY APPARATUS INCLUDING THE SAME

(71) Applicant: SAMSUNG DISPLAY CO., LTD., Yongin-si, Gyeonggi-Do (KR)

(72) Inventors: Jun-Ho Hwang, Asan-si (KR); Ho-In Kim, Seoul (KR); Shim-Ho Yi, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 273 days.

(21) Appl. No.: 15/063,847

(22) Filed: Mar. 8, 2016

(65) Prior Publication Data

US 2017/0039981 A1 Feb. 9, 2017

(30) Foreign Application Priority Data

Aug. 6, 2015 (KR) ........................ 10-2015-0111047

(51) Int. Cl.
*G09G 3/36* (2006.01)
*H02M 3/07* (2006.01)

(52) U.S. Cl.
CPC ......... *G09G 3/3696* (2013.01); *G09G 3/3611* (2013.01); *G09G 2300/0426* (2013.01); *G09G 2310/0291* (2013.01); *G09G 2310/08* (2013.01); *G09G 2330/02* (2013.01)

(58) Field of Classification Search
CPC ............... G09G 3/3611; G09G 3/3696; G09G 2300/0426; G09G 2310/0291; G09G 2310/08; G09G 2330/02; H02M 2003/1552; H02M 3/00; G05F 1/10
See application file for complete search history.

(56) References Cited

U.S. PATENT DOCUMENTS

| | | | | |
|---|---|---|---|---|
| 7,034,607 B2 * | 4/2006 | Otake | .................. | H02M 3/156 315/308 |
| 7,463,223 B2 * | 12/2008 | Kimura | .................. | G05F 3/242 345/76 |
| 7,741,899 B2 * | 6/2010 | Fujiwara | ................. | H02M 3/07 327/536 |
| 7,902,910 B2 * | 3/2011 | Park | ........................ | H02M 3/07 327/536 |
| 8,223,177 B2 * | 7/2012 | Nathan | ................ | G09G 3/3233 345/204 |

(Continued)

*Primary Examiner* — Bryan Earles
(74) *Attorney, Agent, or Firm* — F. Chau & Associates, LLC

(57) ABSTRACT

A boosting voltage generator includes a switching circuit, a control circuit and a boosting circuit. The switching circuit is connected to a first input terminal receiving a first frame signal and a second input terminal receiving a second frame signal, and generates a first switching signal and a second switching signal based on a voltage at the first input terminal and a voltage at the second input terminal. The second frame signal has a phase opposite to that of the first frame signal. The control circuit is connected to the first and second input terminals, and selectively connects the first and second input terminals with a ground voltage based on a mode selection signal. The boosting circuit generates a first boosting voltage and a second boosting voltage based on the first switching signal, the second switching signal, a first feedback voltage and a second feedback voltage.

20 Claims, 10 Drawing Sheets

(56) References Cited

U.S. PATENT DOCUMENTS

| | | | | |
|---|---|---|---|---|
| 2002/0021606 | A1* | 2/2002 | Tsuchi | G09G 3/3688 365/203 |
| 2003/0146788 | A1* | 8/2003 | Maki | H03F 1/0261 330/255 |
| 2008/0094041 | A1* | 4/2008 | Gerber | H02M 3/07 323/233 |
| 2009/0009004 | A1* | 1/2009 | Fujiwara | H02M 3/07 307/80 |
| 2010/0026679 | A1* | 2/2010 | Fujiwara | G09G 3/3696 345/214 |
| 2010/0207929 | A1* | 8/2010 | Miyazaki | G09G 3/3696 345/213 |
| 2013/0100102 | A1 | 4/2013 | Lee et al. | |
| 2016/0260385 | A1* | 9/2016 | Kawano | G09G 3/3258 |

* cited by examiner

10

BOOSTING VOLTAGE GENERATOR AND A DISPLAY APPARATUS INCLUDING THE SAME

CROSS-REFERENCE TO RELATED APPLICATION

This application claims priority under 35 U.S.C. § 119 to Korean Patent Application No. 10-2015-0111047, filed on Aug. 6, 2015 in the Korean Intellectual Property Office (KIPO), the disclosure of which is incorporated by reference herein in its entirety.

TECHNICAL FIELD

Exemplary embodiments of the present invention relate to display apparatuses, and more particularly, to boosting voltage generators for providing boosting voltages to display panels and display apparatuses including the boosting voltage generators.

DISCUSSION OF RELATED ART

A liquid crystal display (LCD) apparatus may include a first substrate including a pixel electrode, a second substrate including a common electrode, and a liquid crystal layer disposed between the first and second substrates. Voltages may be applied to the pixel electrode and the common electrode to generate an electric field in the liquid crystal layer. The electric field may control the transmittance of light passing through the liquid crystal layer, and thus, a desired image may be displayed.

SUMMARY

According to an exemplary embodiment of the present invention, a boosting voltage generator includes a switching circuit, a control circuit and a boosting circuit. The switching circuit is connected to a first input terminal for receiving a first frame signal and a second input terminal for receiving a second frame signal. The switching circuit generates a first switching signal and a second switching signal based on a voltage at the first input terminal and a voltage at the second input terminal. The second frame signal has a phase opposite to that of the first frame signal. The control circuit is connected to the first and second input terminals, and selectively connects the first and second input terminals with a ground voltage based on a mode selection signal. The boosting circuit generates a first boosting voltage and a second boosting voltage based on the first switching signal, the second switching signal, a first feedback voltage and a second feedback voltage.

In an exemplary embodiment of the present invention, when the mode selection signal has a first logic level, the first and second input terminals may be not connected to the ground voltage, and each of the first and second boosting voltages may swing between a first voltage level and a second voltage level. When the mode selection signal has a second logic level, the first and second input terminals may be connected to the ground voltage, and each of the first and second boosting voltages may be fixed at a third voltage level.

In an exemplary embodiment of the present invention, the control circuit may include a first resistor, a second resistor and a first transistor. The first resistor may include a first terminal of the first resistor connected to the first and second input terminals, and a second terminal of the first resistor.

The second resistor may include a first terminal of the second resistor connected to the mode selection signal, and a second terminal of the second resistor. The first transistor may include a first electrode connected to the second terminal of the first resistor, a control electrode connected to the second terminal of the second resistor, and a second electrode connected to the ground voltage.

In an exemplary embodiment of the present invention, the control circuit may include a first switch. The first switch may include a first terminal and a second terminal. The first terminal of the first switch is connected to the first and second input terminals. The second terminal of the first switch is connected to the ground voltage. The first switch may be selectively turned on based on the mode selection signal.

In an exemplary embodiment of the present invention, the switching circuit may include a first switching signal generating circuit and a second switching signal generating circuit. The first switching signal generating circuit may generate the first switching signal based on a first reference voltage when the first input terminal has a first voltage level, and may generate the first switching signal based on a second reference voltage when the first input terminal has a second voltage level. The second switching signal generating circuit may generate the second switching signal based on the first reference voltage when the second input terminal has the first voltage level, and may generate the second switching signal based on the second reference voltage when the second input terminal has the second voltage level.

In an exemplary embodiment of the present invention, the boosting circuit may include a first boosting voltage generating circuit and a second boosting voltage generating circuit. The first boosting voltage generating circuit may generate the first boosting voltage based on the second switching signal and the first feedback voltage. The second boosting voltage generating circuit may generate the second boosting voltage based on the first switching signal and the second feedback voltage.

According to an exemplary embodiment of the present invention, a display apparatus includes a timing controller, a boosting voltage generator and a display panel. The timing controller generates output image data based on input image data, generates a mode selection signal from the input image data, and generates a first frame signal and a second frame signal. Each of the first and second frame signals indicates a duration for one frame image. The second frame signal has a phase opposite to that of the first frame signal. The boosting voltage generator generates a first boosting voltage and a second boosting voltage based on the first frame signal, the second frame signal and the mode selection signal. The display panel includes a plurality of pixels, and operates based on the output image data, the first boosting voltage and the second boosting voltage. The boosting voltage generator includes a switching circuit, a control circuit and a boosting circuit. The switching circuit is connected to a first input terminal for receiving the first frame signal and a second input terminal for receiving the second frame signal, and generates a first switching signal and a second switching signal based on a voltage at the first input terminal and a voltage at the second input terminal. The control circuit is connected to the first and second input terminals, and selectively connects the first and second input terminals with a ground voltage based on the mode selection signal. The boosting circuit generates the first boosting voltage and the second boosting voltage based on the first switching signal, the second switching signal, a first feedback voltage and a second feedback voltage.

In an exemplary embodiment of the present invention, when the mode selection signal has a first logic level, the first and second input terminals may be not connected to the ground voltage, and each of the first and second boosting voltages may swing between a first voltage level and a second voltage level. When the mode selection signal has a second logic level, the first and second input terminals may be connected to the ground voltage, and each of the first and second boosting voltages may be fixed at a third voltage level.

In an exemplary embodiment of the present invention, the timing controller may set the mode selection signal at the first logic level during a first operation mode. The timing controller may set the mode selection signal at the second logic level during a second operation mode. The target image displayed on the display panel based on the input image data does not include a reference pattern in the first operation mode. The target image includes the reference pattern in the second operation mode.

In an exemplary embodiment of the present invention, polarities of data voltages applied to the display panel may be reversed for every pixel in a pixel row during the first operation mode. The polarities of the data voltages may be reversed for every six pixels in the pixel row during the second operation mode.

In an exemplary embodiment of the present invention, the control circuit may include a first resistor, a second resistor and a first transistor. The first resistor may include a first terminal connected to the first and second input terminals, and a second terminal. The second resistor may include a first terminal connected to the mode selection signal, and a second terminal. The first transistor may include a first electrode connected to the second terminal of the first resistor, a control electrode connected to the second terminal of the second resistor, and a second electrode connected to the ground voltage.

In an exemplary embodiment of the present invention, the control circuit may include a first switch. The first switch may include a first terminal connected to the first and second input terminals, and a second terminal connected to the ground voltage. The first switch may be selectively turned on based on the mode selection signal.

In an exemplary embodiment of the present invention, the switching circuit may include a first switching signal generating circuit and a second switching signal generating circuit. The first switching signal generating circuit may generate the first switching signal based on a first reference voltage when the first input terminal has a first voltage level, and may generate the first switching signal based on a second reference voltage when the first input terminal has a second voltage level. The second switching signal generating circuit may generate the second switching signal based on the first reference voltage when the second input terminal has the first voltage level, and may generate the second switching signal based on the second reference voltage when the second input terminal has the second voltage level.

In an exemplary embodiment of the present invention, the boosting circuit may include a first boosting voltage generating circuit and a second boosting voltage generating circuit. The first boosting voltage generating circuit may generate the first boosting voltage based on the second switching signal and the first feedback voltage. The second boosting voltage generating circuit may generate the second boosting voltage based on the first switching signal and the second feedback voltage.

In an exemplary embodiment of the present invention, the plurality of pixels may include a first pixel and a second pixel. The first pixel may include a first high pixel and a first low pixel. The second pixel may include a second high pixel and a second low pixel, and may be adjacent to the first pixel along a first direction. The first boosting voltage may be applied to the first high pixel, and the second boosting voltage may be applied to the second high pixel.

In an exemplary embodiment of the present invention, the first high pixel may include a first high pixel electrode, a first transistor and a second transistor. The first transistor may apply a first data voltage to the first high pixel electrode. The second transistor may apply the first boosting voltage to the first high pixel electrode. The first low pixel may include a first low pixel electrode and a third transistor. The third transistor may apply the first data voltage to the first low pixel electrode.

In an exemplary embodiment of the present invention, a first boosting line for transmitting the first boosting voltage may be extended in the first direction.

In an exemplary embodiment of the present invention, a first boosting line for transmitting the first boosting voltage may be extended in a second direction crossing the first direction.

In an exemplary embodiment of the present invention, the first and second feedback voltages may be provided from the display panel.

According to an exemplary embodiment of the present invention, a display apparatus includes a timing controller and a display panel. The timing controller generates output image data based on input image data, generates a mode selection signal from the input image data, generates a first frame signal and a second frame signal, and generates a first boosting voltage and a second boosting voltage based on the first frame signal, the second frame signal and the mode selection signal. Each of the first and second frame signals indicates a duration for one frame image. The second frame signal has a phase opposite to that of the first frame signal. The display panel includes a plurality of pixels, and operates based on the output image data, the first boosting voltage and the second boosting voltage. The timing controller includes a boosting voltage generator. The boosting voltage generator includes a switching circuit, a control circuit and a boosting circuit. The switching circuit is connected to a first input terminal receiving the first frame signal and a second input terminal receiving the second frame signal, and generates a first switching signal and a second switching signal based on a voltage at the first input terminal and a voltage at the second input terminal. The control circuit is connected to the first and second input terminals, and selectively connects the first and second input terminals with a ground voltage based on the mode selection signal. The boosting circuit generates the first boosting voltage and the second boosting voltage based on the first switching signal, the second switching signal, a first feedback voltage and a second feedback voltage.

According to an exemplary embodiment of the present invention, a boosting voltage generator includes a switching circuit and a boosting circuit. The switching circuit is connected to a first input terminal for receiving a first voltage and a second input terminal for receiving a second voltage. The switching circuit generates a first switching signal and a second switching signal based on the first voltage and the second voltage. The boosting circuit generates a first boosting voltage and a second boosting voltage based on the first switching signal, the second switching signal, a first feedback voltage and a second feedback voltage.

In an exemplary embodiment of the present invention, the control circuit is connected to the first and second input terminals, and selectively connects the first and second input terminals with a ground voltage based on a mode selection signal.

In an exemplary embodiment of the present invention, the switching circuit includes a first switching signal generating circuit and a second switching signal generating circuit. The first switching signal generating circuit generates the first switching signal based on a first reference voltage when the first input terminal has a first voltage level. The first switching signal generating circuit generates the first switching signal based on a second reference voltage when the first input terminal has a second voltage level. The second switching signal generating circuit generates the second switching signal based on the first reference voltage when the second input terminal has a first voltage level. The second switching signal generating circuit generates the second switching signal based on a second reference voltage when the second input terminal has a second voltage level.

In an exemplary embodiment of the present invention, the boosting circuit includes a first boosting voltage generating circuit and a second boosting voltage generating circuit. The first boosting voltage generating circuit generates the first boosting voltage based on the second switching signal and the first feedback voltage. The second boosting voltage generating circuit generates the second boosting voltage based on the first switching signal and the second feedback voltage.

In an exemplary embodiment of the present invention, the timing controller may set the mode selection signal to a first operation mode when a target image displayed on the display panel does not include a reference pattern. The timing controller may set the mode selection signal to a second operation mode when the target image includes the reference pattern.

In an exemplary embodiment of the present invention, polarities of data voltages applied to the display panel may be reversed for every pixel in a pixel row during the first operation mode. The polarities of the data voltages may be reversed for every two or more pixels in the pixel row during the second operation mode.

BRIEF DESCRIPTION OF THE DRAWINGS

The above and other features of the present invention will become more apparent by describing in detail exemplary embodiments thereof with reference to the accompanying drawings.

DETAILED DESCRIPTION OF THE EMBODIMENTS

Figure 1:
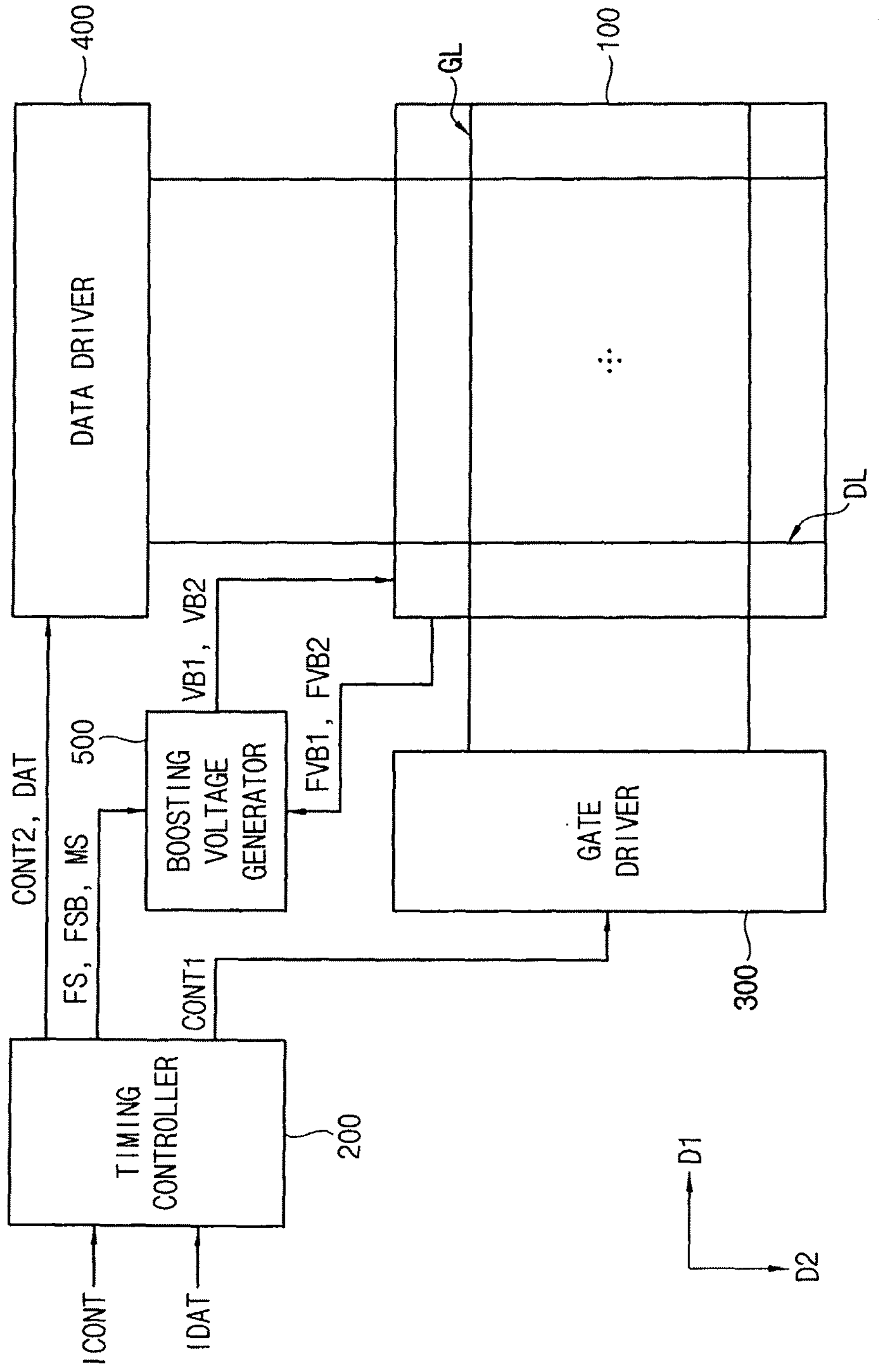
FIG. 1 is a block diagram illustrating a display apparatus according to an exemplary embodiment of the present invention.

Various exemplary embodiments of the present invention will be described hereinafter with reference to the accompanying drawings. The present invention may, however, be embodied in many different forms and should not be construed as limited to the embodiments set forth herein. Like reference numerals may refer to like elements throughout this application.

FIG. 1 is a block diagram illustrating a display apparatus according to an exemplary embodiment of the present invention.

Referring to FIG. 1, a display apparatus 10 includes a display panel 100, a timing controller 200, a gate driver 300, a data driver 400 and a boosting voltage generator 500.

The display panel 100 is connected to a plurality of gate lines GL and a plurality of data lines DL. The gate lines GL may extend in a first direction D1, and the data lines DL may extend in a second direction D2 crossing the first direction D1. The second direction may be substantially perpendicular to D1.

The display panel 100 includes a plurality of pixels that are arranged in a matrix form. Each pixel may be electrically connected to a respective one of the gate lines GL and a respective one of the data lines DL. For example, as will be described with reference to FIGS. 9 and 10, each pixel may include a high pixel and a low pixel. The display panel 100 operates (e.g., displays an image) based on output image data DAT, a first boosting voltage VB1 and a second boosting voltage VB2.

The timing controller 200 controls an operation of the display panel 100 and controls operations of the gate driver 300, the data driver 400 and the boosting voltage generator 500. The timing controller 200 receives input image data IDAT and an input control signal ICONT from an external device (e.g., a host or a graphic processor). The input image data IDAT may include a plurality of input pixel data for the plurality of pixels. The input control signal ICONT may include a master clock signal, a data enable signal, a vertical synchronization signal, a horizontal synchronization signal, etc.

The timing controller 200 generates the output image data DAT based on the input image data IDAT. For example, the timing controller 200 may selectively perform image quality compensation, spot compensation, adaptive color correction (ACC), and/or dynamic capacitance compensation (DCC) on the input image data IDAT to generate the output image data DAT. The timing controller 200 generates a first control signal CONT1 based on the input control signal ICONT. The first control signal CONT1 may be provided to the gate driver 300, and a driving timing of the gate driver 300 may be controlled based on the first control signal CONT1. The first control signal CONT1 may include a vertical start signal, a gate clock signal, etc. The timing controller 200 generates a second control signal CONT2 based on the input control signal ICONT. The second control signal CONT2 may be provided to the data driver 400, and a driving timing of the data driver 400 may be controlled based on the second control signal CONT2. The second control signal CONT2 may include a horizontal start signal, a data clock signal, a data load signal, a polarity control signal, etc.

In the display apparatus 10 according to an exemplary embodiment of the present invention, the timing controller 200 generates a first frame signal FS and a second frame signal FSB based on the input control signal ICONT. For example, the display panel 100 may display a plurality of frame images based on the output image data DAT during a plurality of frames, and may display each frame image during each frame. One frame may indicate a time to display one frame image on the display panel 100, and may be referred to as one frame period and/or a duration for one frame image. Each of the first and second frame signals FS and FSB may indicate the duration for one frame image. The timing controller 200 may output the first and second frame signals FS and FSB respectively, through a plurality of pins (e.g., GPO3 and GPO4 pins).

In addition, the timing controller 200 generates a mode selection signal MS by analyzing the input image data IDAT. The mode selection signal MS may indicate one of a first and a second operation mode. In the first operation mode, a target image displayed on the display panel 100 based on the input image data IDAT may not include a reference pattern. In the second operation mode, the target image may include the reference pattern. For example, the reference pattern may be a pattern causing heat and/or distortion on the display panel 100. The first operation mode may be referred to as a normal operation mode, and the second operation mode may be referred to as a voltage swing minimization (VSM) mode. The timing controller 200 may output the mode selection signal MS through a pin (e.g., a DEBUG2 pin).

In an exemplary embodiment of the present invention, the display panel 100 may operate based on an inversion driving scheme in which a polarity pattern of the plurality of frame images is changed (e.g., reversed) for a set or predetermined period. For example, a polarity of a data voltage applied to each pixel may be reversed, with respect to a common voltage, for every frame. The inversion driving scheme may prevent a characteristic of the liquid crystal in the display panel 100 from being degraded. The first operation mode may be a 1-dot inversion mode in which polarities of data voltages applied to the display panel 100 are reversed for every pixel along the first and second directions D1 and D2. The second operation mode may be a H6-dot inversion mode in which the polarities of the data voltages are reversed every six pixels along the first direction D1.

The gate driver 300 generates a plurality of gate signals for driving the gate lines GL based on the first control signal CONT1. The gate driver 300 may sequentially apply the gate signals to the gate lines GL.

The data driver 400 generates a plurality of analog data voltages based on the second control signal CONT2 and the digital output image data DAT. The data driver 400 may apply the data voltages to the data lines DL. For example, the data driver 400 may include a shift register, a latch, a signal processor and a buffer.

The boosting voltage generator 500 generates the first boosting voltage VB1 and the second boosting voltage VB2 based on the first frame signal FS, the second frame signal FSB and the mode selection signal MS. The first and second boosting voltages VB1 and VB2 may be applied to the high pixel included in each pixel to increase a side visibility of the display panel 100.

In an exemplary embodiment of the present invention, the gate driver 300, the data driver 400 and/or the boosting voltage generator 500 may be disposed, e.g., directly mounted, on the display panel 100, or may be connected to the display panel 100 in a tape carrier package (TCP) type. In an exemplary embodiment of the present invention, the gate driver 300, the data driver 400 and/or the boosting voltage generator 500 may be integrated on the display panel 100.

Figure 2:
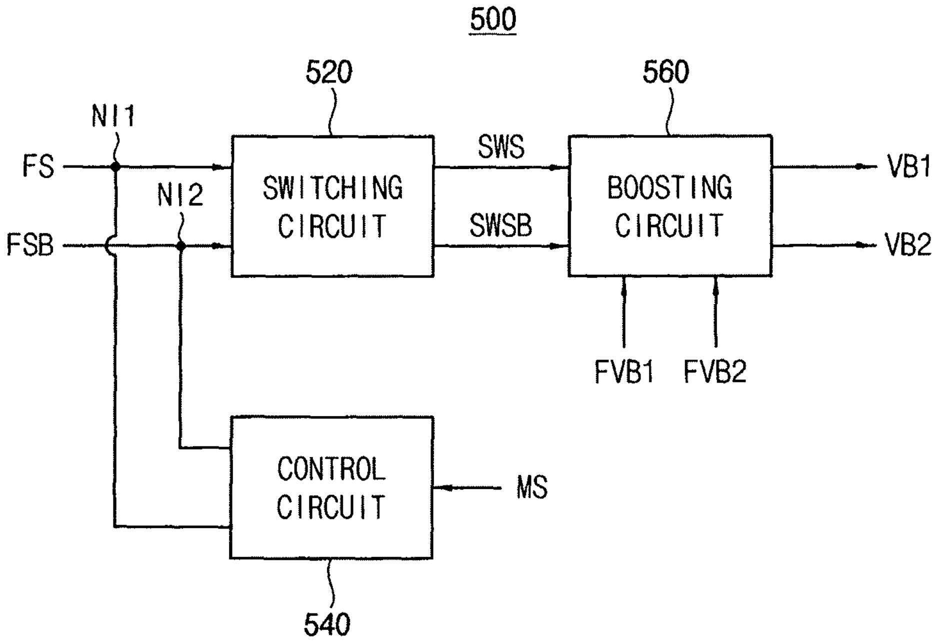
FIG. 2 is a block diagram illustrating a boosting voltage generator according to an exemplary embodiment of the present invention.

FIG. 2 is a block diagram illustrating a boosting voltage generator according to an exemplary embodiment of the present invention.

Referring to FIGS. 1 and 2, a boosting voltage generator 500 includes a switching circuit 520, a control circuit 540 and a boosting circuit 560.

The switching circuit 520 is connected to a first input terminal NI1 (or a first input node) receiving the first frame signal FS and a second input terminal NI2 (or a second input node) receiving the second frame signal FSB. The second frame signal FSB has a phase opposite to that of the first frame signal FS. The switching circuit 520 generates a first switching signal SWS and a second switching signal SWSB based on a voltage at the first input terminal NI1 and a voltage at the second input terminal NI2.

The control circuit 540 is connected to the first and second input terminals NI1 and NI2. The control circuit 540 selectively connects the first and second input terminals NI1 and NI2 with a ground voltage based on the mode selection signal MS. For example, when the mode selection signal MS has a first logic level (e.g., during the first operation mode), the first and second input terminals NI1 and NI2 may be not connected to the ground voltage. When the mode selection signal MS has a second logic level different from the first logic level (e.g., during the second operation mode), the first and second input terminals NI1 and NI2 may be connected to the ground voltage. For example, the first logic level may be a logic low level, and the second logic level may be a logic high level.

The boosting circuit 560 generates the first boosting voltage VB1 and the second boosting voltage VB2 based on the first switching signal SWS, the second switching signal SWSB, a first feedback voltage FVB1 and a second feedback voltage FVB2.

In an exemplary embodiment of the present invention, the first and second feedback voltages FVB1 and FVB2 may be provided from the display panel 100. As illustrated in FIG. 1, the first and second boosting voltages VB1 and VB2 may be applied to the display panel 100, and the first and second boosting voltages VB1 and VB2 that are delayed and/or attenuated by the display panel 100 may be obtained as the first and second fed back voltages FVB1 and FVB2. For example, the first and second feedback voltages FVB1 and FVB2 may be fed back from a region in the display panel 100 farthest from the boosting voltage generator 500.

As described above with reference to FIG. 1, the display panel 100 may operate based on the inversion driving scheme. The boosting voltages VB1 and VB2 may activate the high pixel during the first operation mode of the inversion driving scheme. The control circuit 540 may not connect the first and second input terminals NI1 and NI2 with the ground voltage during the first operation mode, and thus each of the first and second boosting voltages VB1 and VB2 may swing between a first voltage level (e.g., a low voltage level) and a second voltage level (e.g., a high voltage level). The boosting voltages VB1 and VB2 may not be active during the second operation mode of the inversion driving scheme. The control circuit 540 may connect the first and second input terminals NI1 and NI2 with the ground voltage during the second operation mode, and thus each of the first and second boosting voltages VB1 and VB2 may be fixed at a third voltage level (e.g., a middle voltage level) different from the first and second voltage levels.

Figure 3:
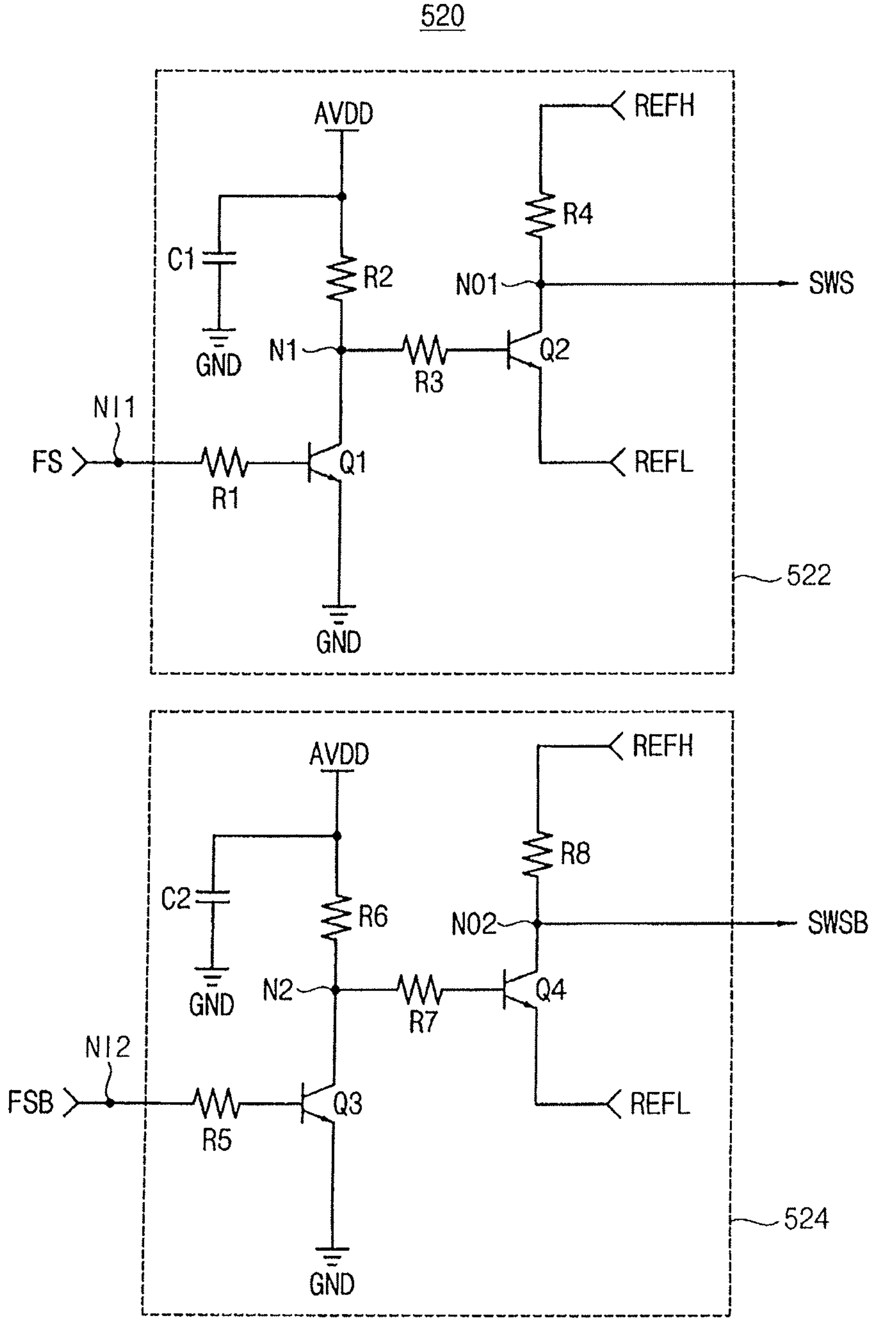
FIG. 3 is a circuit diagram illustrating a switching circuit included in the boosting voltage generator according to an exemplary embodiment of the present invention.

FIG. 3 is a circuit diagram illustrating a switching circuit included in the boosting voltage generator according to an exemplary embodiment of the present invention.

Referring to FIGS. 2 and 3, a switching circuit 520 may include a first switching signal generating circuit 522 and a second switching signal generating circuit 524.

The first switching signal generating circuit 522 may generate the first switching signal SWS based on a first reference voltage REFL when the first input terminal NI1 has the first voltage level (e.g., the low voltage level), and may generate the first switching signal SWS based on a second reference voltage REFH when the first input terminal NI1 has the second voltage level (e.g., the high voltage level) different from the first voltage level. For example, a voltage level of the first reference voltage REFL may be lower than a voltage level of the second reference voltage REFH.

The second switching signal generating circuit 524 may generate the second switching signal SWSB based on the first reference voltage REFL when the second input terminal NI2 has the first voltage level, and may generate the second switching signal SWSB based on the second reference voltage REFH when the second input terminal NI2 has the second voltage level.

The first switching signal generating circuit 522 may have a structure which is substantially the same as that of the second switching signal generating circuit 524. For example, the first switching signal generating circuit 522 may include transistors Q1 and Q2, resistors R1, R2, R3 and R4, and a capacitor C1. The second switching signal generating circuit 524 may include transistors Q3 and Q4, resistors R5, R6, R7 and R8, and a capacitor C2.

The transistor Q1 may have a first electrode, e.g. a collector, connected to a node N1, a second electrode, e.g. an emitter, connected to a ground voltage GND, and may have a control electrode connected to the resistor R1. The transistor Q2 may have a first electrode, e.g. a collector, connected to a node NO1, a second electrode, e.g. an emitter, connected to the first reference voltage REFL, and may have a control electrode connected to the resistor R3. The resistor R1 may be connected between the first input terminal NI1 and the control electrode of the transistor Q1. The resistor R2 may be connected between a power supply voltage AVDD and the node N1. The resistor R3 may be connected between the node N1 and the control electrode of the transistor Q2. The resistor R4 may be connected between the second reference voltage REFH and the node NO1. The capacitor C1 may be connected between the power supply voltage AVDD and the ground voltage GND. The first switching signal SWS may be output from the node NO1.

The transistor Q3 may have a first electrode, e.g. a collector, connected to a node N2, a second electrode, e.g. an emitter, connected to the ground voltage GND, and may have a control electrode connected to the resistor R5. The transistor Q4 may have a first electrode, e.g. a collector, connected to a node NO2, a second electrode, e.g. an emitter, connected to the first reference voltage REFL, and may have a control electrode connected to the resistor R7. The resistor R5 may be connected between the second input terminal NI2 and the control electrode of the transistor Q3. The resistor R6 may be connected between the power supply voltage AVDD and the node N2. The resistor R7 may be connected between the node N2 and the control electrode of the transistor Q4. The resistor R8 may be connected between the second reference voltage REFH and the node NO2. The capacitor C2 may be connected between the power supply voltage AVDD and the ground voltage GND. The second switching signal SWSB may be output from the node NO2.

Figure 4:
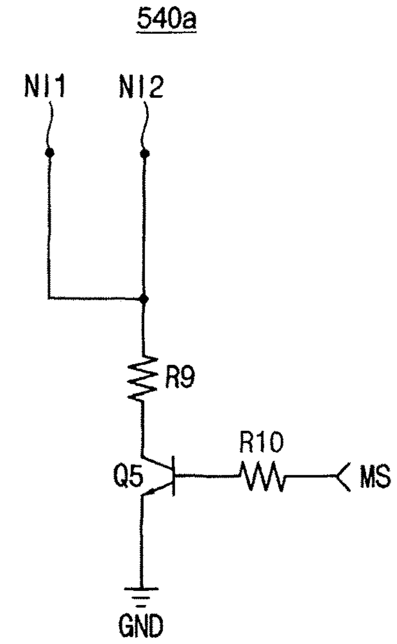
FIGS. 4 and 5 are circuit diagrams illustrating a control circuit included in the boosting voltage generator according to an exemplary embodiment of the present invention.
Figure 5:
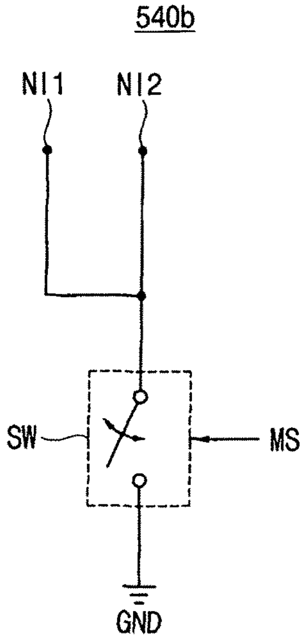

FIGS. 4 and 5 are circuit diagrams illustrating a control circuit included in the boosting voltage generator according to an exemplary embodiment of the present invention.

Referring to FIGS. 2 and 4, a control circuit 540*a* may include resistors R9 and R10, and a transistor Q5.

The resistor R9 may include a first terminal connected to the first and second input terminals NI1 and NI2, and a second terminal. The resistor R10 may include a first terminal connected to the mode selection signal MS, and a second terminal. The transistor Q5 may include a first electrode, e.g. a collector, connected to the second terminal of the resistor R9, a control electrode connected to the second terminal of the resistor R10, and a second electrode, e.g. an emitter, connected to the ground voltage GND.

In other words, the resistor R9 may be connected between the first and second input terminals NI1 and NI2 and the transistor Q5. The resistor R10 may be connected between the mode selection signal MS and the transistor Q5. The transistor Q5 may be connected between the resistor R9 and the ground voltage GND, and may include the control electrode connected to the resistor R10.

In an exemplary embodiment of the present invention, at least one of the resistors R9 and R10 may be omitted.

Referring to FIGS. 2 and 5, a control circuit 540*b* may include a switch SW.

The switch SW may include a first terminal connected to the first and second input terminals NI1 and NI2, and a second terminal connected to the ground voltage GND. In other words, the switch SW may be connected between the first and second input terminals NI1 and NI2 and the ground voltage GND. The switch SW may be selectively turned on based on the mode selection signal MS.

In an exemplary embodiment of the present invention, the switch SW may include any switching element.

Figure 6:
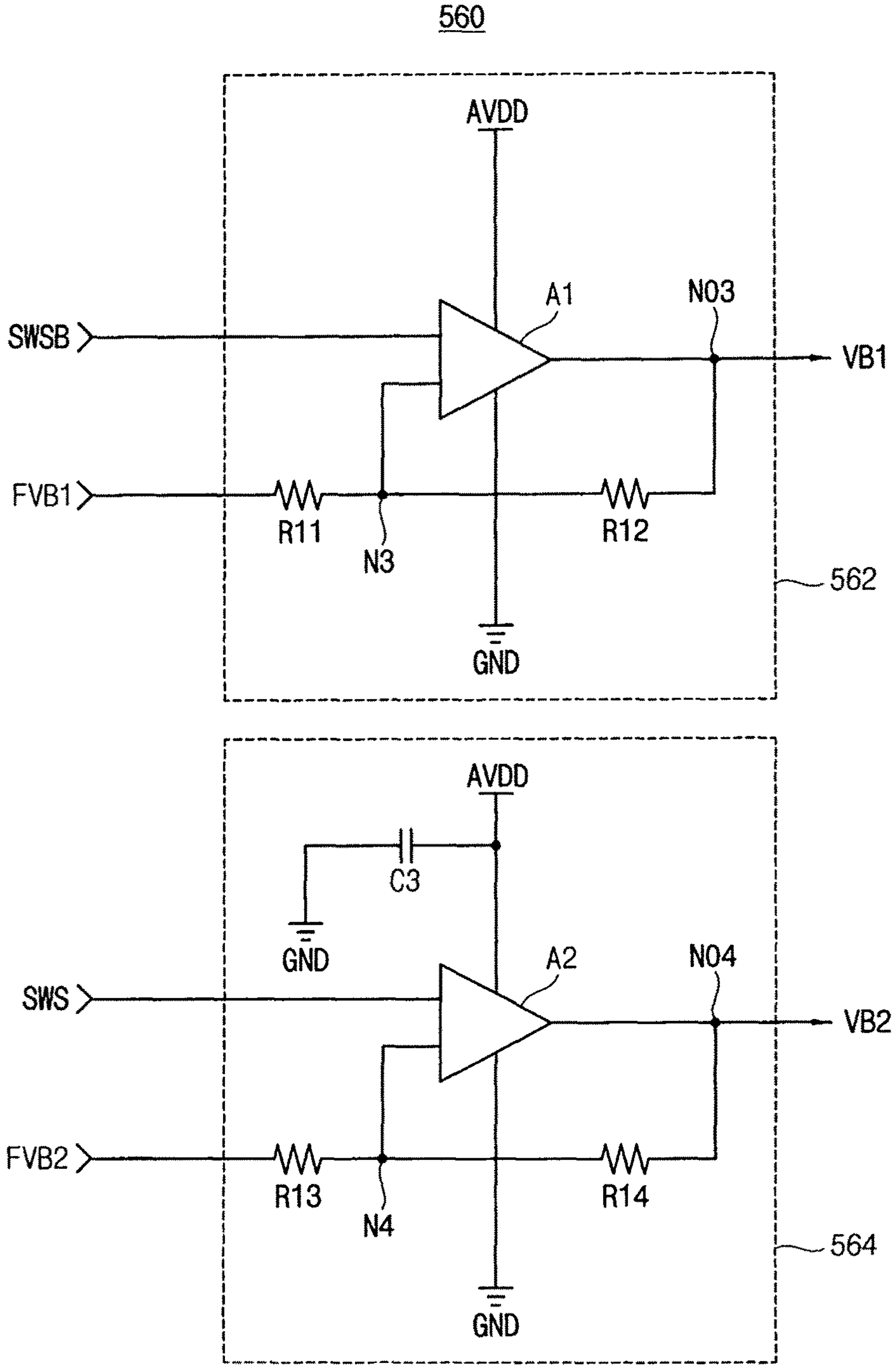
FIG. 6 is a circuit diagram illustrating a boosting circuit included in the boosting voltage generator according to an exemplary embodiment of the present invention.

FIG. 6 is a circuit diagram illustrating a boosting circuit included in the boosting voltage generator according to an exemplary embodiment of the present invention.

Referring to FIGS. 2 and 6, a boosting circuit 560 may include a first boosting voltage generating circuit 562 and a second boosting voltage generating circuit 564.

The first boosting voltage generating circuit 562 may generate the first boosting voltage VB1 based on the second switching signal SWSB and the first feedback voltage FVB1. The second boosting voltage generating circuit 564 may generate the second boosting voltage VB2 based on the first switching signal SWS and the second feedback voltage FVB2.

The first boosting voltage generating circuit 562 may have a structure which is similar to that of the second boosting voltage generating circuit 564. For example, the first boosting voltage generating circuit 562 may include a comparator A1 and resistors R11 and R12. The second boosting voltage generating circuit 564 may include a comparator A2, resistors R13 and R14 and a capacitor C3.

The comparator A1 may be connected between the power supply voltage AVDD and the ground voltage GND. The comparator A1 may include a first input terminal connected to the second switching signal SWSB, a second input terminal connected to a node N3, and an output terminal connected to a node NO3. The resistor R11 may be connected between the first feedback voltage FVB1 and the node N3. The resistor R12 may be connected between the node N3 and the node NO3. The first boosting voltage VB1 may be output from the node NO3.

The comparator A2 may be connected between the power supply voltage AVDD and the ground voltage GND. The comparator A2 may include a first input terminal connected to the first switching signal SWS, a second input terminal connected to a node N4, and an output terminal connected to a node NO4. The resistor R13 may be connected between the second feedback voltage FVB2 and the node N4. The resistor R14 may be connected between the node N4 and the node NO4. The capacitor C3 may be connected between the power supply voltage AVDD and the ground voltage GND. The second boosting voltage VB2 may be output from the node NO4.

Figure 7:
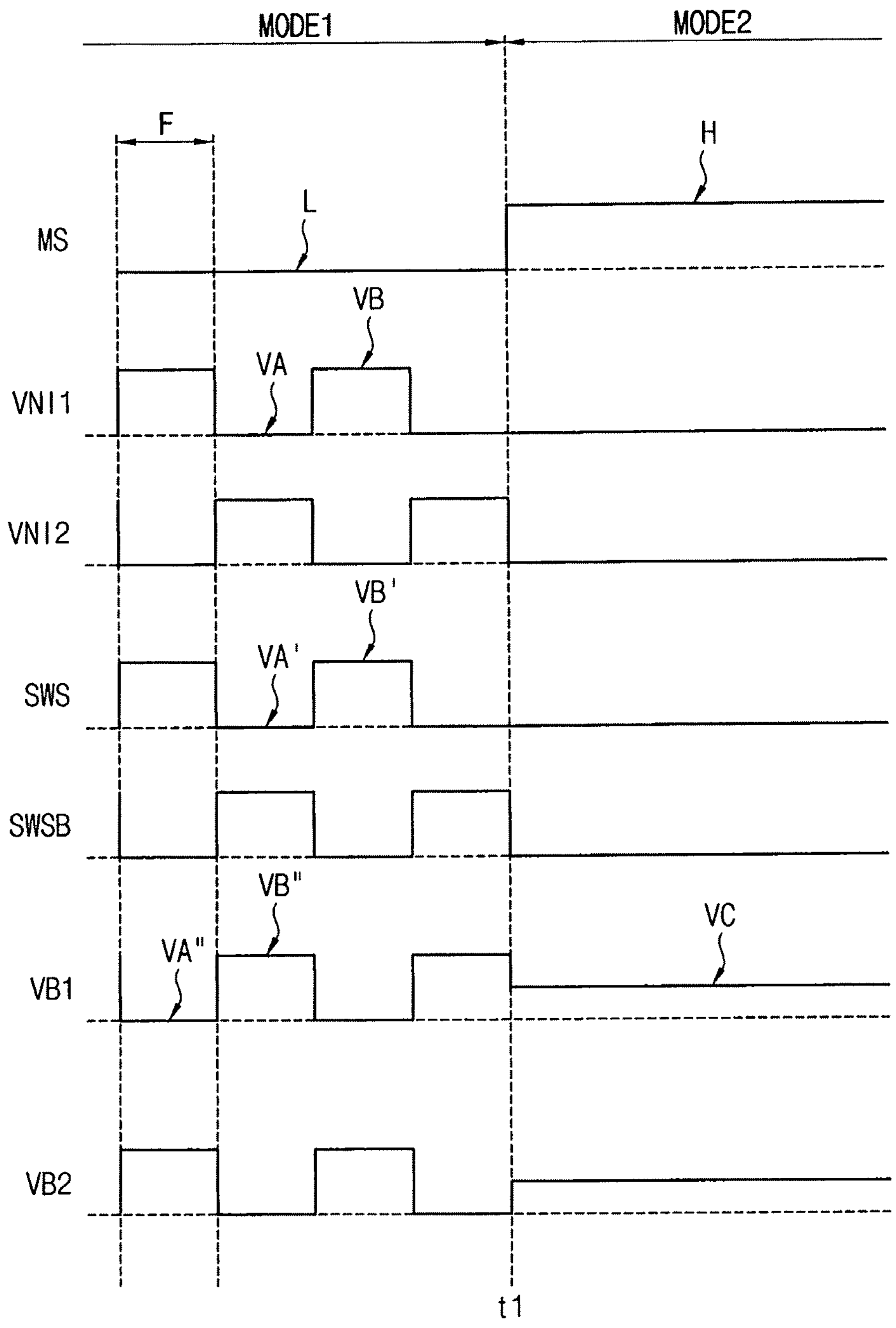
FIG. 7 is a timing diagram for describing an operation of the boosting voltage generator according to an exemplary embodiment of the present invention.
Figure 8A:
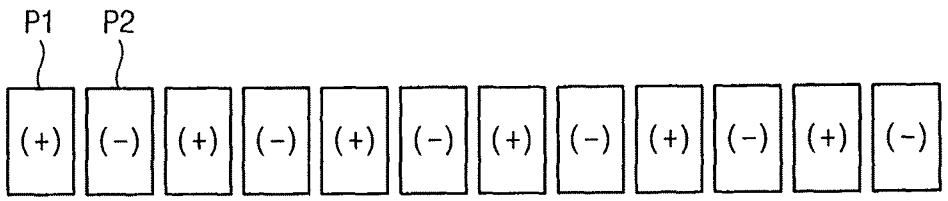
FIGS. 8A and 8B are diagrams illustrating a polarity pattern on a display panel depending on an operation mode according to an exemplary embodiment of the present invention.
Figure 8B:
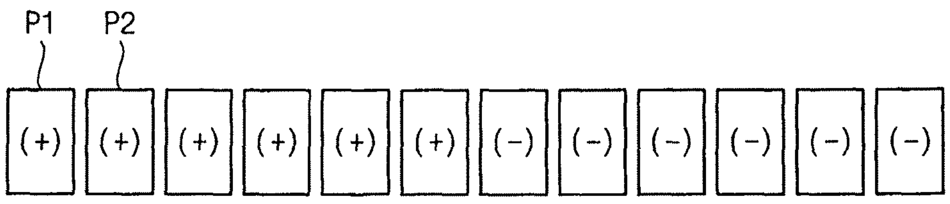

FIG. 7 is a timing diagram for describing an operation of the boosting voltage generator according to an exemplary embodiment of the present invention. FIG. 8A is a diagram illustrating a polarity pattern on a display panel in a first operation mode according to an exemplary embodiment of the present invention. FIG. 8B is a diagram illustrating a polarity pattern on a display panel in a second operation mode according to an exemplary embodiment of the present invention. In FIG. 7, VNI1 indicates the voltage at the first input terminal NI1, and VNI2 indicates the voltage at the second input terminal NI2.

The operation of the display apparatus 10 and the boosting voltage generator 500 according to exemplary embodiments will be described in detail with reference to FIGS. 1, 2, 3, 4, 5, 6, 7, 8A and 8B.

The timing controller 200 generates the mode selection signal MS by analyzing the input image data IDAT.

In an exemplary embodiment of the present invention, when the target image displayed on the display panel 100, based on the input image data IDAT, does not include the reference pattern, e.g., the pattern causing heat and/or distortion on the display panel 100 [e.g., before time t1 in FIG. 7], the timing controller 200 determines that the display apparatus 10 is operating in the first operation mode MODE1 and sets the mode selection signal MS as a logic low level L. The reference pattern may be a pattern causing heat and/or distortion on the display panel 100.

When the display apparatus 10 operates in the first operation mode MODE1, the display panel 100 may operate in the 1-dot inversion mode in which the polarities of the data voltages applied to the display panel 100 are reversed for every pixel in a pixel row. For example, as illustrated in FIG. 8A, during a first frame, a first pixel row may have a polarity pattern of "+, −, +, −, +, −, +, −, +, −, +, −." During a second frame subsequent to the first frame of FIG. 8A, the first pixel row may have a polarity pattern of "−, +, −, +, −, +, −, +, −, +, −, +." In other words, in the first operation mode MODE1, the display panel 100 may have a polarity pattern of a 1-dot inversion where a single pixel is surrounded by pixels having the opposite polarity.

When the mode selection signal MS has the logic low level L, the first and second input terminals NI1 and NI2 of the boosting voltage generator 500 are not connected to the ground voltage GND, and thus phases of the voltages at the first and second input terminals NI1 and NI2 are substantially the same as phases of the first and second frame signals FS and FSB, respectively. Each of the first and second frame signals FS and FSB swings between a first low voltage level VA and a first high voltage level VB after a duration F for one frame image. For example, the first frame signal FS and the voltage VNI1 at the first input terminal NI1 may swing in an order of VB, VA, VB and VA. The second frame signal FSB and the voltage VNI2 at the second input terminal NI2 may swing in an order of VA, VB, VA and VB.

Since the first switching signal SWS is generated based on the voltage VNI1 at the first input terminal NI1, and since the second boosting voltage VB2 is generated based on the first switching signal SWS, the phase of the voltage VNI1, a phase of the first switching signal SWS, and a phase of the second boosting voltage VB2 are substantially the same as each other. Similarly, a phase of the voltage VNI2 at the second input terminal NI2, a phase of the second switching signal SWSB, and a phase of the first boosting voltage VB1 are substantially the same as each other. Each of the first and second switching signals SWS and SWSB swings between a second low voltage level VA' and a second high voltage level VB' per the duration F. Each of the first and second boosting voltages VB1 and VB2 swings between a third low voltage level VA" and a third high voltage level VB" per the duration F.

In the first operation mode MODE1, the first and second boosting voltages VB1 and VB2 may be applied to the plurality of pixels (e.g., a boosting function may be enabled). For example, odd-numbered pixels (e.g., a pixel P1) in the first pixel row of FIG. 8A may receive a boosting voltage that has a positive polarity during the first frame and has a negative polarity during the second frame. Even-numbered pixels (e.g., a pixel P2) in the first pixel row of FIG. 8A may receive a boosting voltage that has the negative polarity during the first frame and has the positive polarity during the second frame. Thus, the display panel 100 may have an increased display quality and an increased response speed.

In an exemplary embodiment of the present invention, when the target image displayed on the display panel 100 based on the input image data IDAT includes the reference pattern, e.g., the pattern causing heat and/or distortion on the display panel 100 (e.g., after time t1 in FIG. 7), the timing controller 200 determines that the display apparatus 10 operates in the second operation mode MODE2 and sets the mode selection signal MS as a logic high level H.

When the display apparatus 10 operates in the second operation mode MODE2, the display panel 100 may operate in the H6-dot inversion mode in which the polarities of the data voltages applied to the display panel 100 are reversed every six pixels in the pixel row. For example, as illustrated in FIG. 8B, during a third frame, a second pixel row may have a polarity pattern of "+, +, +, +, +, +, −, −, −, −, −, −." During a fourth frame subsequent to the third frame in FIG. 8B, the second pixel row may have a polarity pattern of "−, −, −, −, −, −, +, +, +, +, +, +." In other words, in the second operation mode MODE2, the display panel 100 may have a polarity pattern of a 6-dot inversion where six pixels in a single pixel row have the same polarity with each other and the six pixels in a single pixel row are surrounded by pixels having the opposite polarity.

In an exemplary embodiment of the present invention, when the display apparatus 10 operates in the second operation mode MODE2, the display panel 100 may operate in an inversion mode in which the polarities of the data voltages applied to the display panel 100 are reversed every one or more pixels in the pixel row. For example, during a third frame, a first pixel row may have a polarity pattern of "+, −, +, −, +, −" and the second pixel row may have a polarity pattern of "+, −, +, −, +, −." In this example, during a second operation mode MODE2, the display panel 100 may have a polarity pattern of a 1-dot inversion where rows or columns alternate polarity. In a different example, during a third frame, a first pixel row may have a polarity pattern of "+, +, +, +, +, +, +, −, −, −, −, −, −, −" and the second pixel row may have a polarity pattern of "+, +, +, +, +, +, +, −, −, −, −, −, −, −." In this example, during a second operation mode MODE2, the display panel 100 may have a polarity pattern of a 7-dot inversion where seven pixels in a single pixel row have the same polarity with each other and the seven pixels in a single pixel row are surrounded by pixels having the opposite polarity.

When the mode selection signal MS has the logic high level H, the first and second input terminals NI1 and NI2 of the boosting voltage generator 500 are connected to the ground voltage GND, and thus each of the voltages at the first and second input terminals NI1 and NI2 are set to the ground voltage GND or the first low voltage level VA. In addition, each of the first and second frame signals FS and FSB are set at the second low voltage level VA', and each of the first and second boosting voltages VB1 and VB2 are set at a middle voltage level VC.

If the boosting function is enabled in the second operation mode MODE2, a pixel voltage (e.g., a voltage at the pixel P1) may be compensated based on a boosting voltage having a polarity substantially the same as that of the data voltage, however, another pixel voltage (e.g., a voltage at the pixel P2) may be distorted based on a boosting voltage having a polarity different from that of the data voltage. Accordingly, in the second operation mode MODE2, the boosting function may be disabled, the first and second boosting voltages VB1 and VB2 may not swing (e.g., may be fixed) between a high and low voltage. Barring VB1 and VB2 from swinging may prevent the pixel voltage from being distorted and degrading the display quality.

According to an exemplary embodiment of the present invention, the first low voltage level VA, the second low voltage level VA' and the third low voltage level VA" may be substantially the same as each other, or may be different from each other. According to an exemplary embodiment of the present invention, the first high voltage level VB, the second high voltage level VB' and the third high voltage level VB" may be substantially the same as each other, or may be different from each other.

In an exemplary embodiment of the present invention, the second low voltage level VA' may correspond to the level of the first reference voltage REFL, and the second high voltage level VB' may correspond to the level of the second reference voltage REFH. In an exemplary embodiment of the present invention, the third low voltage level VA" may be about 0V, and the third high voltage level VB" may be about 15V. The middle voltage level VC may be between the third low voltage level VA" and the third high voltage level VB" (e.g., about 7.5V).

Figure 9:
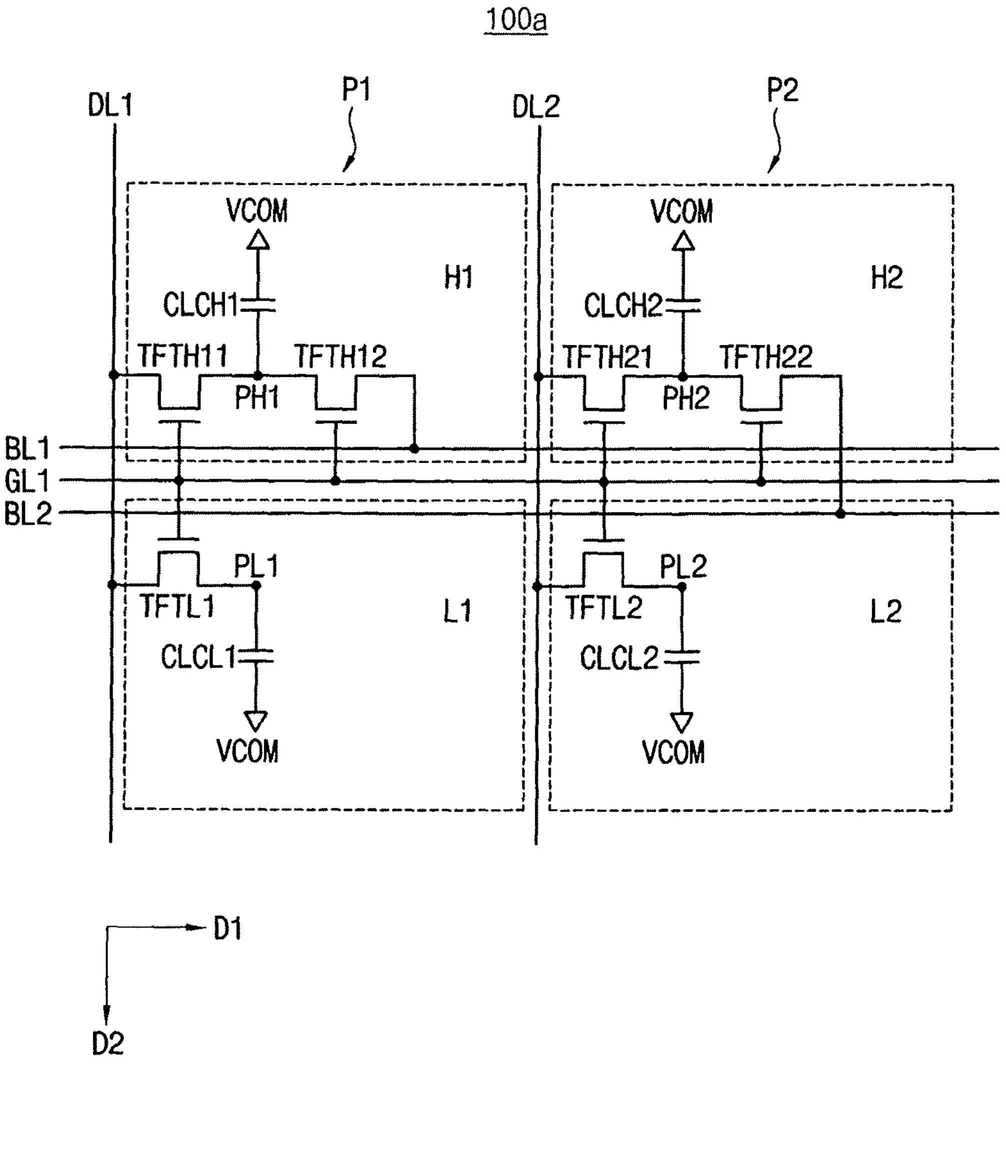
FIGS. 9 and 10 are diagrams illustrating a pixel structure of a display panel included in the display apparatus according to an exemplary embodiment of the present invention.
Figure 10:
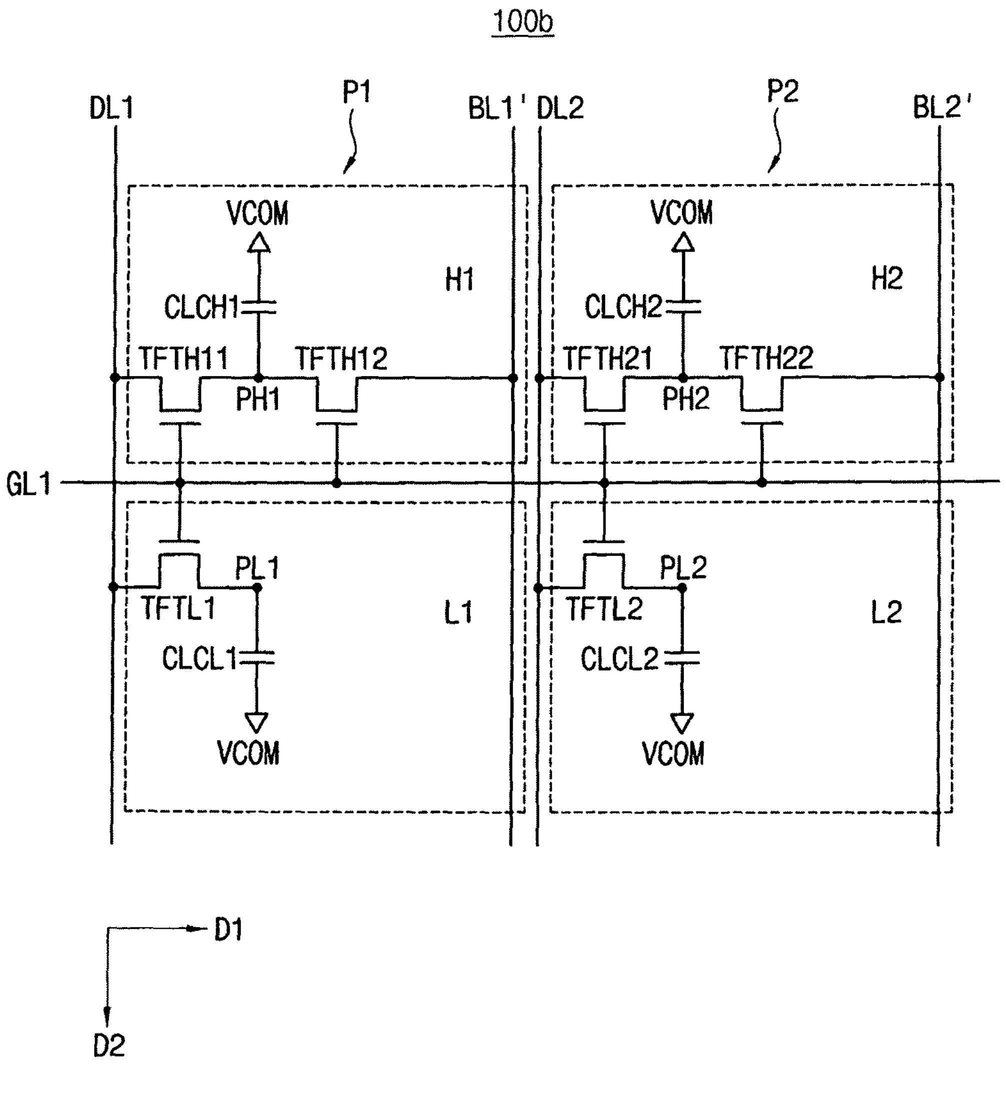

FIGS. 9 and 10 are diagrams illustrating a pixel structure of a display panel included in the display apparatus according to an exemplary embodiment of the present invention.

Although two pixels are illustrated in FIGS. 9 and 10, FIGS. 9 and 10 represent a portion of the display panel. The pixel structures in FIGS. 9 and 10 may be repeated throughout the display area of the display panel.

Referring to FIG. 9, a display panel 100*a* may include a first pixel P1 and a second pixel P2.

The first pixel P1 may include a first high pixel H1 and a first low pixel L1. The second pixel P2 may be adjacent to the first pixel P1 along the first direction D1, and may include a second high pixel H2 and a second low pixel L2.

The first high pixel H1 may include a first high pixel electrode PH1, a first transistor TFTH11 and a second transistor TFTH12. The first transistor TFTH11 may apply a first data voltage to the first high pixel electrode PH1. The second transistor TFTH12 may apply the first boosting voltage VB1 to the first high pixel electrode PH1. A first high pixel liquid crystal capacitor CLCH1 may be formed between the first high pixel electrode PH1 and a common electrode to which a common voltage VCOM is applied.

The first low pixel L1 may include a first low pixel electrode PL1 and a third transistor TFTL1. The third transistor TFTL1 may apply the first data voltage to the first low pixel electrode PL1. A first low pixel liquid crystal capacitor CLCL1 may be formed between the first low pixel electrode PL1 and the common electrode.

The first transistor TFTH11 may include a first electrode connected to a first data line DL1, which provides the first data voltage, a control electrode connected to a first gate line GL1, and a second electrode connected to the first high pixel electrode PH1. The second transistor TFTH12 may include a first electrode connected to a first boosting line BL1, which provides the first boosting voltage VB1, a control electrode connected to the first gate line GL1, and a second electrode connected to the first high pixel electrode PH1. The third transistor TFTL1 may include a first electrode connected to the first data line DL1, a control electrode connected to the first gate line GL1, and a second electrode connected to the first low pixel electrode PL1.

The second high pixel H2 may include a second high pixel electrode PH2, a fourth transistor TFTH21 and a fifth transistor TFTH22. The fourth transistor TFTH21 may apply a second data voltage to the second high pixel electrode PH2. The fifth transistor TFTH22 may apply the second boosting voltage VB2 to the second high pixel electrode PH2. A second high pixel liquid crystal capacitor CLCH2 may be formed between the second high pixel electrode PH2 and the common electrode.

The second low pixel L2 may include a second low pixel electrode PL2 and a sixth transistor TFTL2. The sixth transistor TFTL2 may apply the second data voltage to the second low pixel electrode PL2. A second low pixel liquid crystal capacitor CLCL2 may be formed between the second low pixel electrode PL2 and the common electrode.

The fourth transistor TFTH21 may include a first electrode connected to a second data line DL2, which provides the second data voltage, a control electrode connected to the first gate line GL1, and a second electrode connected to the second high pixel electrode PH2. The fifth transistor TFTH22 may include a first electrode connected to a second boosting line BL2, which provides the second boosting voltage VB2, a control electrode connected to the first gate line GL1, and a second electrode connected to the second high pixel electrode PH2. The sixth transistor TFTL2 may include a first electrode connected to the second data line DL2, a control electrode connected to the first gate line GL1, and a second electrode connected to the second low pixel electrode PL2.

As described above with reference to FIG. 7, in the first operation mode, the first and second boosting voltages VB1 and VB2 may swing between the low voltage level and the high voltage level. For example, during a first frame in the first operation mode, each of the first data voltage and the first boosting voltage VB1 may have the positive polarity with respect to the common voltage VCOM. During the first operation mode, each of the second data voltage and the second boosting voltage VB2 may have the negative polarity with respect to the common voltage VCOM. During a second frame in the first operation mode subsequent to the first frame, each of the first data voltage and the first boosting voltage VB1 may have the negative polarity with respect to the common voltage VCOM. During the first operation mode, each of the second data voltage and the second boosting voltage VB2 may have the positive polarity with respect to the common voltage VCOM. In the second operation mode, the first and second boosting voltages VB1 and VB2 may not swing and may be fixed at the middle voltage level.

In an exemplary embodiment of the present invention, each of the first and second boosting lines BL1 and BL2 may be extended in the first direction D1. In other words, each of the first and second boosting lines BL1 and BL2 may be substantially parallel with the first gate line GL1. The first and second boosting lines BL1 and BL2 and the first gate line GL1 may be disposed directly on the same layer as each other.

In an exemplary embodiment of the present invention, a size of each of the high pixels H1 and H2 may be equal to or smaller than a size of each of the low pixels L1 and L2. In other words, a size of each of the high pixel electrodes PH1 and PH2 may be equal to or smaller than a size of each of the low pixel electrodes PL1 and PL2. For example, a ratio between the size of the high pixel and the size of the low pixel may be about 1:2.

In an exemplary embodiment of the present invention, a resistance of the first transistor TFTH11 may be smaller than a resistance of the second transistor TFTH12. For example, a width to length (W/L) ratio of a channel of the first transistor TFTH11 may be greater than a width to length (W/L) ratio of a channel of the second transistor TFTH12.

In an exemplary embodiment of the present invention, the display panel 100*a* may further include third and fourth pixels that are adjacent to the first and second pixels P1 and P2 in the second direction D2. The third and fourth pixels may be connected to a second gate line parallel to the first gate line GL1. In an exemplary embodiment of the present invention, the third pixel may be connected to the first data line DL1, and the fourth pixel may be connected to the second data line DL2. In an exemplary embodiment of the present invention, the third pixel may be connected to the second data line DL2, and the fourth pixel may be connected to a third data line parallel to the second gate line DL2.

Referring to FIG. 10, a display panel 100*b* may include a first pixel P1 and a second pixel P2.

The display panel 100*b* of FIG. 10 may be substantially the same as the display panel 100*a* of FIG. 9, except that an arrangement of first and second boosting lines BL1' and BL2' in FIG. 10 is different from an arrangement of the first and second boosting lines BL1 and BL2 in FIG. 9.

In an exemplary embodiment of the present invention, each of the first and second boosting lines BL1' and BL2 may be extended in the second direction D2. In other words, each of the first and second boosting lines BL1' and BL2' may be substantially parallel with the first and second data lines DL1 and DL2. The first and second boosting lines BL1' and BL2' and the first and second data lines DL1 and DL2 may be disposed directly on the same layer as each other.

Figure 11:
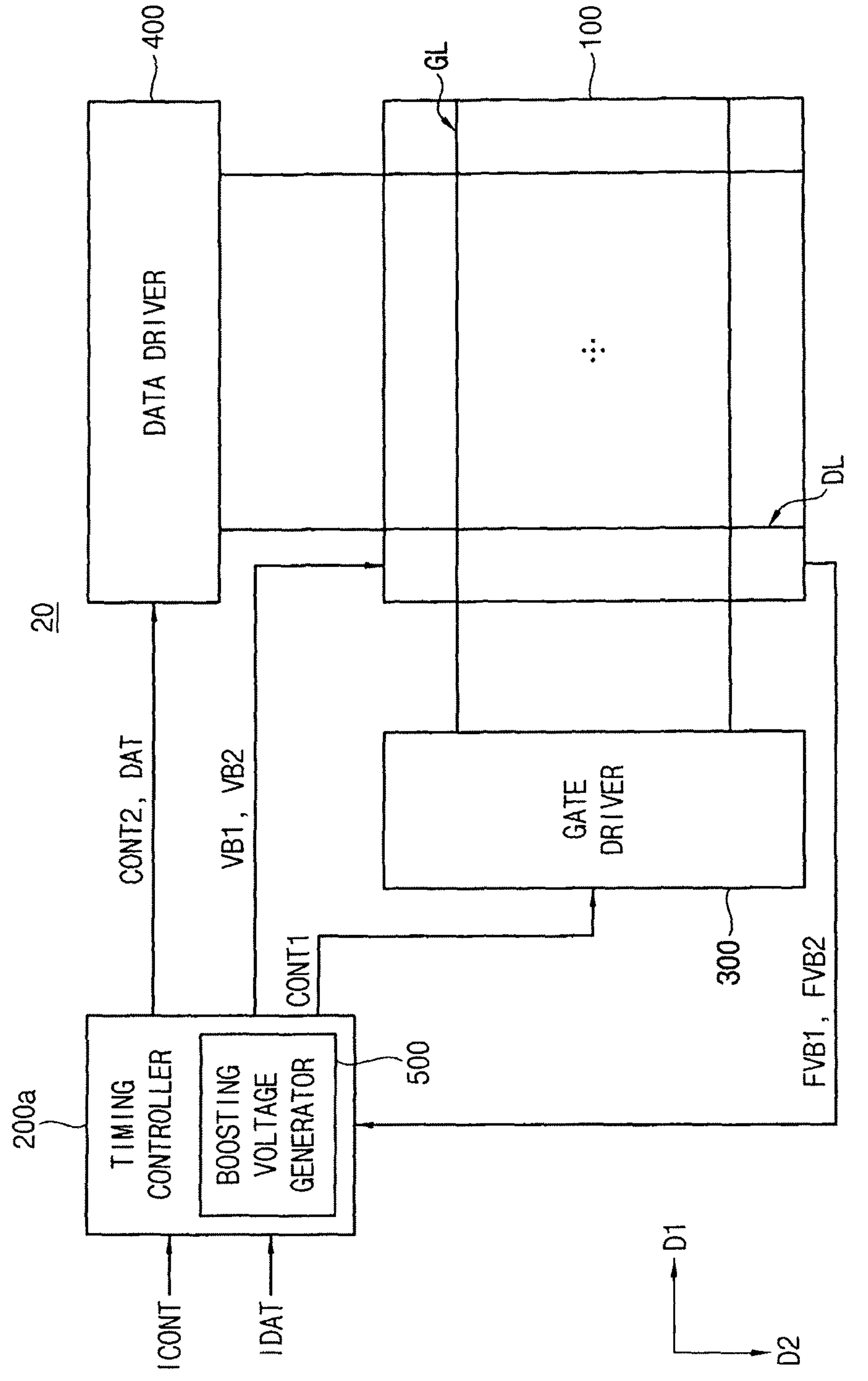
FIG. 11 is a block diagram illustrating a display apparatus according to an exemplary embodiment of the present invention.

FIG. 11 is a block diagram illustrating a display apparatus according to an exemplary embodiment of the present invention.

Referring to FIG. 11, a display apparatus 10*a* includes a display panel 100, a timing controller 200*a*, a gate driver 300 and a data driver 400.

The display apparatus 20 of FIG. 11 may be substantially the same as the display apparatus 10 of FIG. 1, except that a boosting voltage generator 500 in FIG. 11 is disposed in the timing controller 200*a*.

The timing controller 200*a* generates a first frame signal FS and a second frame signal FSB based on the input control signal ICONT, and generates a mode selection signal MS by analyzing the input image data IDAT. The timing controller 200*a* includes the boosting voltage generator 500 that generates a first boosting voltage VB1 and a second boosting voltage VB2 based on the first frame signal FS, the second frame signal FSB and the mode selection signal MS. The boosting voltage generator 500 may have a structure described above with reference to FIGS. 2, 3, 4, 5 and 6, and may operate based on an example described above with reference to FIG. 7.

The display panel 100 may have a structure described above with reference to FIGS. 9 and 10, and may operate based on an example described above with reference to FIGS. 8A and 8B.

The above described embodiments may be used in a display apparatus and/or a system including the display apparatus, such as a mobile phone, a smart phone, a personal digital assistant (PDA), a portable multimedia player (PMP), a digital camera, a digital television, a set-top box, a music player, a portable game console, a navigation device, a personal computer (PC), a server computer, a workstation, a tablet computer, a laptop computer, a smart card, a printer, etc.

While the present inventive concept has been particularly shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A boosting voltage generator comprising:

a switching circuit connected to a first input terminal for receiving a first frame signal and a second input terminal for receiving a second frame signal, the switching circuit configured to generate a first switching signal and a second switching signal based on a voltage at the first input terminal and a voltage at the second input terminal, the second frame signal having a phase opposite to that of the first frame signal;

a control circuit connected to the first and second input terminals, the control circuit configured to selectively connect the first and second input terminals with a ground voltage based on a mode selection signal; and a boosting circuit configured to generate a first boosting voltage and a second boosting voltage based on the first switching signal, the second switching signal, a first feedback voltage input to the boosting circuit after the first boosting voltage passes through a first boosting line of a load and a second feedback voltage input to the boosting circuit after the second boosting voltage passes through a second boosting line of the load.

2. The boosting voltage generator of claim 1, wherein when the mode selection signal has a first logic level, the first and second input terminals are not connected to the ground voltage, and each of the first and second boosting voltages swings between a first voltage level and a second voltage level, wherein when the mode selection signal has a second logic level, the first and second input terminals are connected to the ground voltage, and each of the first and second boosting voltages is fixed at a third voltage level.

3. The boosting voltage generator of claim 1, wherein the control circuit includes:

a first resistor including a first terminal and a second terminal, wherein the first terminal of the first resistor is connected to the first and second input terminals;

a second resistor including a first terminal and a second terminal, wherein the first terminal receives the mode selection signal; and a first transistor including a first electrode connected to the second terminal of the first resistor, a control electrode connected to the second terminal of the second resistor, and a second electrode connected to the ground voltage.

4. The boosting voltage generator of claim 1, wherein the control circuit includes:

a first switch including a first terminal and a second terminal, wherein the first terminal is connected to the first and second input terminals, and the second terminal is connected to the ground voltage, wherein the first switch is selectively turned on based on the mode selection signal.

5. The boosting voltage generator of claim 1, wherein the switching circuit includes:

a first switching signal generating circuit configured to generate the first switching signal based on a first reference voltage when the first input terminal has a first voltage level, and configured to generate the first switching signal based on a second reference voltage when the first input terminal has a second voltage level; and a second switching signal generating circuit configured to generate the second switching signal based on the first reference voltage when the second input terminal has the first voltage level, and configured to generate the second switching signal based on the second reference voltage when the second input terminal has the second voltage level.

6. The boosting voltage generator of claim 1, wherein the boosting circuit includes:

a first boosting voltage generating circuit configured to generate the first boosting voltage based on the second switching signal and the first feedback voltage; and a second boosting voltage generating circuit configured to generate the second boosting voltage based on the first switching signal and the second feedback voltage.

7. A display apparatus comprising:

a timing controller configured to generate output image data based on input image data, configured to generate a mode selection signal from the input image data, and configured to generate a first frame signal and a second frame signal, each of the first and second frame signals indicating a duration for one frame image, the second frame signal having a phase opposite to that of the first frame signal;

a boosting voltage generator configured to generate a first boosting voltage and a second boosting voltage based on the first frame signal, the second frame signal and the mode selection signal; and a display panel including a plurality of pixels, the display panel operating based on the output image data, the first boosting voltage and the second boosting voltage, wherein the boosting voltage generator includes:

a switching circuit connected to a first input terminal for receiving the first frame signal and a second input terminal for receiving the second frame signal, the switching circuit configured to generate a first switching signal and a second switching signal based on a voltage at the first input terminal and a voltage at the second input terminal;

a control circuit connected to the first and second input terminals, the control circuit configured to selectively connect the first and second input terminals with a ground voltage based on the mode selection signal; and a boosting circuit configured to generate the first boosting voltage and the second boosting voltage based on the first switching signal, the second switching signal, a first feedback voltage that is fed back to the boosting circuit after passage of the first boosting voltage through a first boosting line of the display panel and a second feedback voltage is fed back to the boosting circuit after passage of the second boosting voltage through a second boosting line of the display panel.

8. The display apparatus of claim 7, wherein when the mode selection signal has a first logic level, the first and second input terminals are not connected to the ground voltage, and each of the first and second boosting voltages swings between a first voltage level and a second voltage level, wherein when the mode selection signal has a second logic level, the first and second input terminals are connected to the ground voltage, and each of the first and second boosting voltages is fixed at a third voltage level.

9. The display apparatus of claim 8, wherein the timing controller sets the mode selection signal as the first logic level during a first operation mode, and the timing controller sets the mode selection signal as the second logic level during a second operation mode, wherein a target image displayed on the display panel based on the input image data does not include a reference pattern in the first operation mode, and the target image includes reference pattern in the second operation mode.

10. The display apparatus of claim 9, wherein polarities of data voltages applied to the display panel are reversed for every pixel in a pixel row during the first operation mode, and the polarities of the data voltages are reversed for every six pixels in the pixel row during the second operation mode.

11. The display apparatus of claim 7, wherein the control circuit includes:

a first resistor including a first terminal and a second terminal, wherein the first terminal of the first resistor is connected to the first and second input terminals;

a second resistor including a first terminal and a second terminal, wherein the first terminal of the second resistor receives the mode selection signal; and a first transistor including a first electrode connected to the second terminal of the first resistor, a control electrode connected to the second terminal of the second resistor, and a second electrode connected to the ground voltage.

12. The display apparatus of claim 7, wherein the control circuit includes:

a first switch including a first terminal and a second terminal, wherein the first terminal is connected to the first and second input terminals, and the second terminal is connected to the ground voltage, wherein the first switch is selectively turned on based on the mode selection signal.

13. The display apparatus of claim 7, wherein the switching circuit includes:

a first switching signal generating circuit configured to generate the first switching signal based on a first reference voltage when the first input terminal has a first voltage level, and configured to generate the first switching signal based on a second reference voltage when the first input terminal has a second voltage level; and a second switching signal generating circuit configured to generate the second switching signal based on the first reference voltage when the second input terminal has the first voltage level, and configured to generate the second switching signal based on the second reference voltage when the second input terminal has the second voltage level.

14. The display apparatus of claim 7, wherein the boosting circuit includes:

a first boosting voltage generating circuit configured to generate the first boosting voltage based on the second switching signal and the first feedback voltage; and a second boosting voltage generating circuit configured to generate the second boosting voltage based on the first switching signal and the second feedback voltage.

15. The display apparatus of claim 7, wherein the plurality of pixels include:

a first pixel including a first high pixel and a first low pixel; and a second pixel including a second high pixel and a second low pixel, the second pixel being adjacent to the first pixel along a first direction, wherein the first boosting voltage is applied to the first high pixel, and the second boosting voltage is applied to the second high pixel.

16. The display apparatus of claim 15, wherein the first high pixel includes:

a first high pixel electrode;

a first transistor configured to apply a first data voltage to the first high pixel electrode; and a second transistor configured to apply the first boosting voltage to the first high pixel electrode, wherein the first low pixel includes:

a first low pixel electrode; and a third transistor configured to apply the first data voltage to the first low pixel electrode.

17. A boosting voltage generator comprising:

a switching circuit connected to a first input terminal for receiving a first voltage and a second input terminal for receiving a second voltage, the switching circuit configured to generate a first switching signal and a second switching signal based on the first voltage and the second voltage; and a boosting circuit configured to generate a first boosting voltage and a second boosting voltage based on the first switching signal, the second switching signal, a first feedback voltage input to the boosting circuit after the first boosting voltage passes through a first boosting line of a load and a second feedback voltage input to the boosting circuit after the second boosting voltage passes through a second boosting line of the load.

18. The boosting voltage generator of claim 17, further comprising a control circuit connected to the first and second input terminals, and to selectively connect the first and second input terminals with a ground voltage based on a mode selection signal.

19. The boosting voltage generator of claim 18, wherein the switching circuit includes:

a first switching signal generating circuit configured to generate the first switching signal based on a first reference voltage when the first input terminal has a first voltage level, and configured to generate the first switching signal based on a second reference voltage when the first input terminal has a second voltage level; and a second switching signal generating circuit configured to generate the second switching signal based on the first reference voltage when the second input terminal has the first voltage level, and configured to generate the second switching signal based on the second reference voltage when the second input terminal has the second voltage level.

20. The boosting voltage generator of claim 18, wherein the boosting circuit includes:

a first boosting voltage generating circuit configured to generate the first boosting voltage based on the second switching signal and the first feedback voltage; and a second boosting voltage generating circuit configured to generate the second boosting voltage based on the first switching signal and the second feedback voltage.

* * * * *